(12) United States Patent
Song et al.

(10) Patent No.: US 10,235,884 B2
(45) Date of Patent: Mar. 19, 2019

(54) WIRELESS BEACON COLLISION WARNING SYSTEM

(71) Applicant: The Curators of the University of Missouri, Columbia, MO (US)

(72) Inventors: Sejun Song, Overland Park, KS (US); Baek-young Choi, Overland Park, KS (US); Kaustubh Dhondge, Kansas City, MO (US)

(73) Assignee: The Curators of the University of Missouri, Columbia, MO (US)

( * ) Notice: Subject to any disclaimer, the term of this patent is extended or adjusted under 35 U.S.C. 154(b) by 15 days.

(21) Appl. No.: 15/114,488

(22) PCT Filed: Jan. 23, 2015

(86) PCT No.: PCT/US2015/012683
§ 371 (c)(1),
(2) Date: Jul. 27, 2016

(87) PCT Pub. No.: WO2015/116498
PCT Pub. Date: Aug. 6, 2015

(65) Prior Publication Data
US 2016/0343256 A1 Nov. 24, 2016

Related U.S. Application Data

(60) Provisional application No. 61/965,344, filed on Jan. 28, 2014.

(51) Int. Cl.
*G08G 1/16* (2006.01)
*H04W 4/029* (2018.01)
(Continued)

(52) U.S. Cl.
CPC ............. *G08G 1/166* (2013.01); *G08G 1/005* (2013.01); *G08G 1/163* (2013.01); *H04L 67/26* (2013.01);
(Continued)

(58) Field of Classification Search
None
See application file for complete search history.

(56) References Cited

U.S. PATENT DOCUMENTS

| 8,154,422 B2 * | 4/2012 | Hsu et al. ..................... 340/903 |
| 8,520,695 B1 * | 8/2013 | Rubin et al. .................. 370/445 |

(Continued)

FOREIGN PATENT DOCUMENTS

| DE | 602005004931 T2 | 2/2009 |
| DE | 102010001869 A1 | 8/2011 |

(Continued)

OTHER PUBLICATIONS

"GM Developing Wireless Pedestrian Detection Technology," http://media.gm.com/media/us/en/gm/news.detail.html/content/Pages/news /us/en/2012/Jul/0726 pedestrian.html, Dated: Jul. 12, 2012.
"Honda Demonstrates Advanced Vehicle-to-Pedestrian and Vehicle-to-Motorcycle Safety Technologies," http://www.honda.com/newsandviews/article.aspx?id=7352-en, Dated: Aug. 28, 2013.
(Continued)

*Primary Examiner* — Brent Swarthout
(74) *Attorney, Agent, or Firm* — Erise IP, P.A.

(57) ABSTRACT

A system, a method, and a computer program for utilizing a WiFi beacon for low-latency communication with smart computing devices. Embodiments of the invention use beacon-stuffed network announcement broadcast signals to promptly convey urgent safety information to pedestrians and other vulnerable road users and to warn them of approaching vehicles. This information can then be used to generate visual or audible alerts that are presented on a smart computing device of the vulnerable road user. Similarly, beacon-stuffed network announcement broadcast signals (Continued)

transmitted by pedestrians' smart computing devices can be used to warn vehicle operators of pedestrians in their path.

19 Claims, 5 Drawing Sheets

(51) Int. Cl.
  H04W 4/80     (2018.01)
  G08G 1/005    (2006.01)
  H04L 29/08    (2006.01)
  H04W 4/02     (2018.01)
(52) U.S. Cl.
  CPC ........... *H04W 4/023* (2013.01); *H04W 4/029* (2018.02); *H04W 4/80* (2018.02)

(56) References Cited

U.S. PATENT DOCUMENTS

| | | | | |
|---|---|---|---|---|
| 2007/0115101 A1* | 5/2007 | Creekbaum | ............ | B60R 25/00 340/426.22 |
| 2009/0088182 A1 | 4/2009 | Piersol et al. | | |
| 2009/0233572 A1* | 9/2009 | Basir | ............ | H04M 3/5116 455/404.1 |
| 2011/0122806 A1* | 5/2011 | Huang | ............ | H04B 7/15514 370/315 |
| 2012/0010762 A1* | 1/2012 | Asano | ............ | G08G 1/166 701/1 |
| 2013/0018572 A1* | 1/2013 | Jang | ............ | G08G 1/164 701/119 |
| 2014/0019005 A1* | 1/2014 | Lee | ............ | G08G 1/0962 701/36 |

FOREIGN PATENT DOCUMENTS

| | | |
|---|---|---|
| DE | 102012210202 A1 | 12/2013 |
| JP | 2012178127 A | 9/2012 |
| WO | 2010134527 A1 | 11/2010 |

OTHER PUBLICATIONS

"Wi-Fi Direct," http://developer.android.com/guide/topics/connectivity/wifip2p.html, printed Dec. 4, 2014, posted date: Unknown.

J. Dulmage, M. Tsai, M. Fitz, and B. Daneshrad, "COTS-based DSRC Testbed for Rapid Algorithm Development, Implementation, and Test ," http://cores.ee.ucla.edu/images/e/ef/Wintech poster Dulmage06.pdf, posted date: Unknown.

R. Chandra, J. Padhye, L. Ravindranath, and A. Wolman, "Beacon-Stuffing: Wi-Fi without Associations," in Eighth IEEE Workshop on Mobile Computing Systems and Applications, HotMobile, pp. 53-57; Publication Date: Unknown.

"Android 2.2 Platform Highlights—Portable hotspot," http://developer.android.com/sdk/android-2.2-highlights.html, printed Dec. 4, 2014, posted date: Unknown.

J. White, C. Thompson, H. Turner, B. Dougherty, and D. Schmidt, "WreckWatch: Automatic Traffic Accident Detection and Notification with Smartphones," Mobile Networks and Applicationsn, vol. 16, No. 3, pp. 285-303, Publication Date: Unknown.

C. Thompson, J. White, B. Dougherty, A. Albright, and D. Schmidt, "Using Smartphones to Detect Car Accidents and Provide Situational Awareness to Emergency Responders," Mobile Wireless Middleware, Operating Systems, and Applications, vol. 48, pp. 29-42, publication date: Unknown.

C. Manasseh, Y. Fallah, R. Sengupta, and J. Misener, "Using Smartphones to Enable Situation Awareness on Highways," in ITS America 20th Annual Meeting and Exposition; Publication Date: Unknown.

J. Zaldivar, Y. Calafate, J. Cano, and P. Manzoni, "Providing accident detection in vehicular networks through OBD-II devices and Androidbased smartphones," in IEEE 36th Conference on Local Computer Networks (LCN), Copyright: 2011.

T. Wang, G. Cardone, A. Corradi, L. Torresani, and A. Campbell, "WalkSafe: a pedestrian safety app for mobile phone users who walk and talk while crossing," in Proceedings of the Twelfth Workshop on Mobile Computing Systems and Applications, Hotmobile, Copyright: 2012.

PCT Patent Application PCT/US2015/012683 International Search Report and Written Opinion dated Apr. 16, 2015.

* cited by examiner

WIRELESS BEACON COLLISION WARNING SYSTEM

RELATED APPLICATIONS

This patent application claims priority benefit, with regard to all common subject matter, of earlier-filed PCT Int'l App. No. PCT/US2015/012683, filed 23 Jan. 2015, and entitled "WIRELESS BEACON COLLISION WARNING SYSTEM," which claims priority to U.S. Provisional Patent Application No. 61/965,344, filed Jan. 28, 2014, and entitled "METHOD FOR UTILIZING WIFI BEACON FOR VEHICULAR COMMUNICATION WITH SMARTPHONES." The identified earlier-filed PCT and provisional patent applications are hereby incorporated by reference in their entirety into the present application.

BACKGROUND

1. Field

Embodiments of the invention generally relate to the field of electronic communication and more specifically to a method of utilizing a WiFi beacon for communication with smart computing devices.

2. Related Art

As smart devices gain popularity, vulnerable road users are increasingly distracted by the activities with the devices, such as listening to music, watching videos, texting, or making calls while walking or bicycling on the road. Such users are increasingly at risk of becoming involved in accidents with vehicles on the streets; the number of headphone-wearing pedestrians seriously injured or killed near roadways and railways has tripled since 2004. Although much work in the area of pedestrian safety in intelligent systems is directed towards alerting a driver of the vehicle with pedestrian detection sensors and nighttime infrared cameras, direct alerts from vehicles to vulnerable road users still heavily rely on the traditional sound warning method of a vehicle horn. However, smartphone-using road users are increasingly shutting out the external safety related warning sounds. In roughly one-third of the serious incidents noted above, eyewitnesses indicated that horns or sirens sounded before the victim was hit. Although various safety infrastructure, such as traffic lights, warning signs, and alert sensors, is deployed on the streets to reduce the risk of collisions, present mechanisms are incapable of providing direct alerts to the distracted vulnerable road users tailored to the specific scenarios.

Thus, there is presently a need for a bi-directional communication system between vehicles and smart devices of vulnerable road users that can directly exchange personalized alerts to both drivers and vulnerable road users to recommend ways to avoid imminent collisions in a timely manner.

SUMMARY

Embodiments of the invention address the above-described problem by providing a system that can deliver personalized alerts to pedestrians of possible collisions and recommend ways to avoid it in a timely manner. Specifically, embodiments of the invention use beacon-stuffed WiFi broadcast signals to convey urgent active pedestrian safety messages between vehicles and pedestrians and other vulnerable road users and to warn them of approaching vehicles. Embodiments of the invention overcome delay limitations imposed by a traditional, connection-oriented WiFi approach and allow low-delay communications between highly mobile devices by removing the conventional step of association with a WiFi access point.

In a first embodiment, the invention is a system for alerting a user of an impending collision, including a first device comprising a transmitter periodically transmitting a wireless network association beacon including position, speed, and direction information associated with the first device. The system further includes a second device comprising a receiver operable to receive the wireless network association beacon, sensors operable to determine position, speed, and direction information associated with the second device, a processor, and one or more computer-readable media. The media, in turn, store computer-executable instructions that, when executed by the processor, perform a method of alerting the user of the impending collision comprising the steps of determining, based on the position, speed, and direction information associated with the first device and the position, speed, and direction information associated with the second device, that the distance between the first device and the second device will be less than a predetermined threshold at a future time, generating an alert of the impending collision, and presenting the alert to the user.

In a second embodiment, the invention includes computer-readable media storing computer-executable instructions which, when executed by a processor, perform a method of alerting a user to an impending collision, comprising the steps of: receiving a wireless network association beacon including position, speed, and direction information associated with a vehicle, determining position, speed, and direction information associated with a user device, generating an estimated position of the user device at a future time and an estimated position of the vehicle at the future time, making a determination that a distance between the estimated position of the user device and the estimated position of the vehicle at the future time is below a predetermined threshold, and in response to the determination, presenting an alert of an imminent collision on the user device.

In a third embodiment, the invention is a mobile computing device comprising a processor, sensors operable to determine position, speed, and direction information associated with the smartphone, a display, a speaker, a wireless network interface operable to receive a wireless network association beacon, and one or more computer-readable media. The media, in turn, store computer-executable instructions which, when executed by the processor, perform a method of alerting a user of the smartphone to an impending collision, comprising the steps of receiving a wireless network association beacon associated with a vehicle and including position, speed, and direction information of the vehicle, determining, based on the position, speed, and direction information associated with the smartphone and the position, speed, and direction information associated with the vehicle, the existence of impending collision between the vehicle and the user of the smartphone, and presenting to the user via the display and the speaker an alert of the impending collision.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Figure 1:
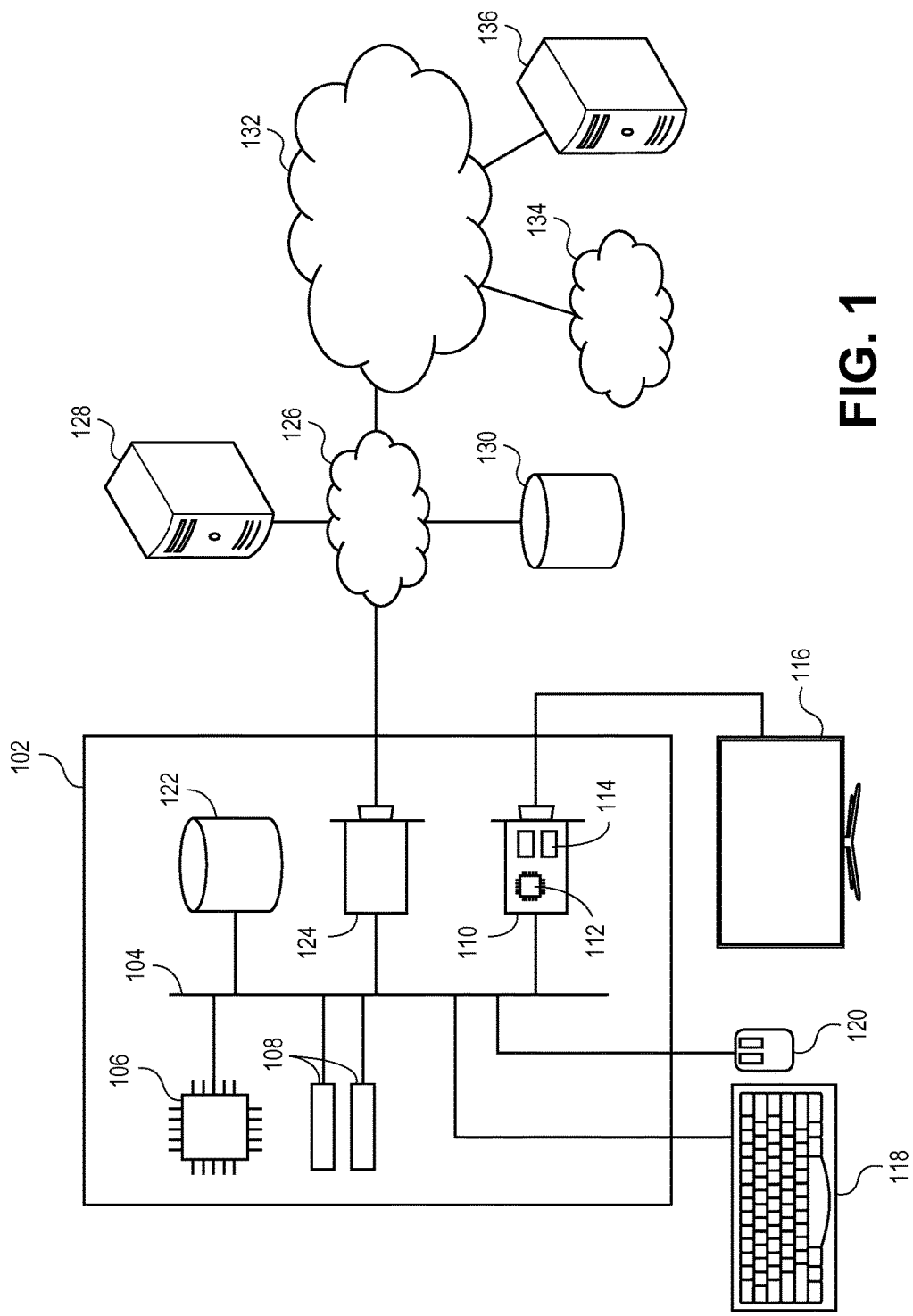
FIG. 1 depicts an exemplary hardware platform of certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

In general, embodiments of the invention provide a system that can deliver personalized alerts to pedestrians of possible collisions and recommend ways to avoid such collisions in a timely manner. Specifically, embodiments of the invention use beacon-stuffed WiFi broadcast signals to convey urgent active pedestrian safety messages between vehicles and pedestrians and other vulnerable road users and to warn them of approaching vehicles. Embodiments of the invention overcome delay limitations imposed by a traditional, connection-oriented WiFi approach and allow low-delay communications between highly mobile devices by removing the conventional step of association with a WiFi access point.

Embodiments of the invention comprise a system, a method, and a computer program for alerting a user, such as a pedestrian, of an impending collision. The system of embodiments of the invention broadly comprises a vehicle or beaconing computing device comprising a transmitter periodically transmitting a wireless network association beacon and a pedestrian or alerting computing device comprising a receiver operable to receive the wireless network association beacon. In embodiments of the invention, the wireless network association beacon transmitted by the transmitter of the vehicle computing device includes position, speed, and direction information associated with the vehicle, and such position, speed, and direction information is transmitted by the vehicle computing device and to the pedestrian computing device. In embodiments, the pedestrian computing device further includes at least one sensor operable to determine position, speed, and direction information associated with the pedestrian computing device; a processor; and one or more computer-readable media. The computer program of embodiments of the invention is stored on the one or more computer-readable media and, when executed by the processor, performs certain steps of the method of embodiments of the invention. In general and as discussed below, embodiments of the invention determine, based on the position, speed, and direction information associated with the vehicle computing device and the position, speed, and direction information associated with the pedestrian computing device, that the distance between the vehicle and pedestrian will be less than a predetermined threshold at a future time. Upon performing this determination, an alert is generated of an impending collision and is presented to the user of the pedestrian computing device. As used in the following discussion, the terms "vehicle computing device" and "pedestrian computing device" are used purely for illustrative purposes. Each device may be associated with a vehicle, a pedestrian, a bicyclist, or other road user. Furthermore, each device may both transmit and receive beacons. A device associated with a user may be generally referred to as a "user device." Additionally, one or both of the vehicle and pedestrian computing devices may be mobile communications devices, such as a smartphone, that are operable to receive and transmit information.

One or both of the vehicle and pedestrian computing devices may be used with exemplary hardware as depicted in FIG. 1. Certain components of computer 102 may be present in the vehicle or pedestrian computing device, or the vehicle and pedestrian computing devices may be communicatively coupled to computer 102. The vehicle and pedestrian computing devices may be used with computer 102 or may replace computer 102. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
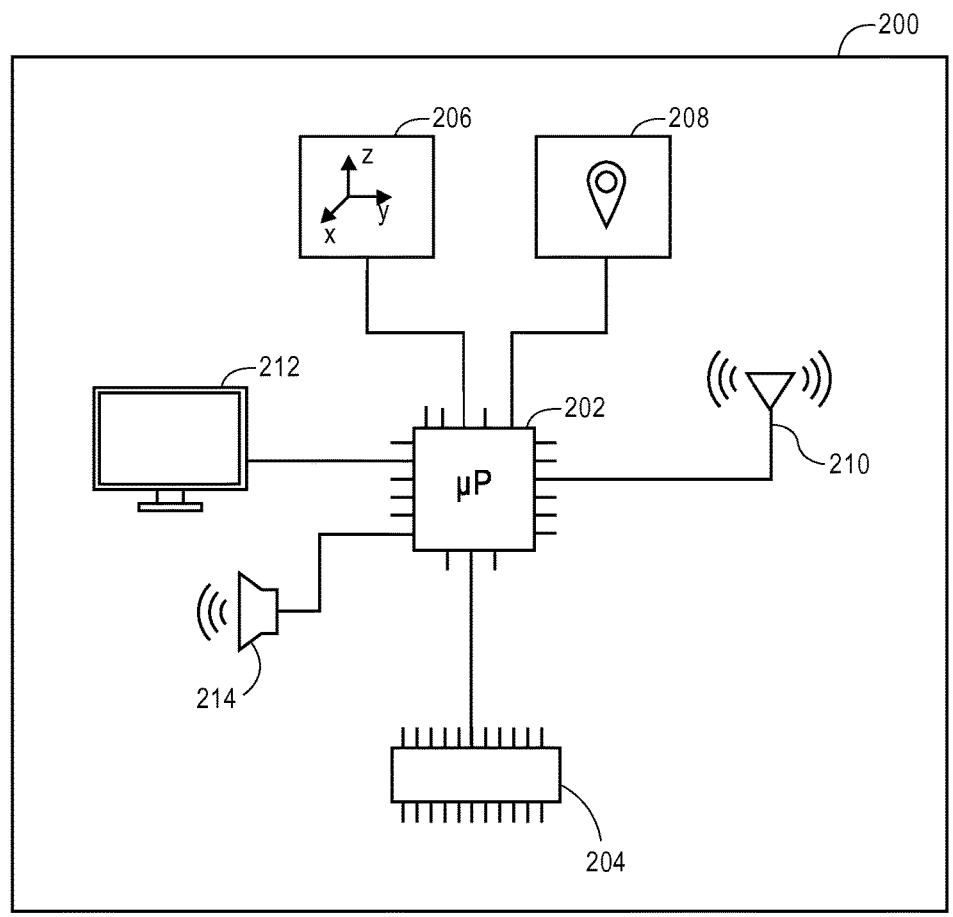
FIG. 2 depicts a block diagram of the components of a device of certain embodiments of the invention.

Turning now to FIG. 2, a block diagram of the components of the computing devices is depicted. It is first noted that the vehicle and user computing devices may be different types of devices, may be the same type of device, may have different components and functions, or may have the same components and functions. For example, a first computing device, which is, in embodiments, associated with the vehicle, may be installed in the vehicle (either OEM or retrofit) or carried by a user within the vehicle. The first computing device may be a mobile communications device, such as a smartphone, PDA, tablet, or laptop; a navigational device, such as a stand-alone GPS system (or, alternatively, the first computing device may include a navigational device, as discussed below); or a special-purpose computing device associated with the vehicle and for specialized use to perform the functions discussed herein. A second computing device, which is, in embodiments, associated with a pedestrian, may be a smartphone, PDA, tablet, or laptop; or a navigational device, such as a stand-alone GPS system (or, alternatively, the first computing device may include a navigational device, as discussed below). In yet further embodiments that are not limited to a vehicle and a pedestrian, other types of computing devices may be used as the first and second computing devices. FIG. 2 depicts an exemplary computing device that may serve as either or both of the first and second computing devices. It is noted that the first and second computing devices may comprise all or some of the components illustrated in FIGS. 1 and 2 and discussed below, depending on the functional requirements of the device. Therefore, it should be appreciated that a discussion of the first and second computing devices below is intended to describe the various components and corresponding features the computing devices may include but do not necessarily have to include. Furthermore, each device 200 may be communicatively coupled to one or more local networks or the Internet as depicted in FIG. 1. In some embodiments, this network connection is for the convenience of a user of device 200 and to provide an incentive for the user to be paying attention to device 200. In other embodiment, such a network connection is used to obtain information used in the operation of the system, including network locations, vehicle size information, map information, etc.

Device 200 generally comprises a processor 202, a storage memory 204, sensors 206 and 208, and a wireless radio 210. In some embodiments, device 200 may additionally comprise display 212 and/or speaker 214, or both. It is an advantage of the invention that many, if not all, of the above-listed components of the first and second computing devices are already present in a variety of devices, such as smartphones, tablets, laptop computers, body-mounted computers, vehicles, and other similar devices. Such devices can then be adapted for use in embodiments of the invention by storing appropriate computer-executable instructions in storage memory 204 for execution by processor 202. Processor 202 can be any commercially available or custom-designed microprocessor, microcontroller, field-programmable gate array, or system-on-a-chip. In some embodiments, processor 202 is a general-purpose processor, while in other embodiments, processor 202 is a special-purpose device. Similarly, storage memory 204 may be any form of computer-readable medium, as described above. In some embodiments, storage memory 204 is integrated into processor 202; in other embodiments, it is a discrete chip. In some embodiments, storage memory 204 is non-volatile; in other embodiments, storage memory 204 can be volatile with some way to persist or reload information after a loss of power.

Sensors 206 and 208 generally operate alone or in combination to obtain position, speed, and direction information associated with device 200. In some embodiments, only a single sensor may be present, while in other embodiments, more than two sensors may be present. Any suitable representation or coordinate system may be used, as is most convenient for the sensors used or implementation. As a first example, position information can be obtained through a global-positioning system receiver. Other sensors for determining position are also possible. For example, triangulation using signal strength and/or direction of known transmitters (such as, for example, cell towers or wireless access points) may be used to determine position. In some embodiments, wireless radio 210 can act as a sensor in this role. Alternatively, inertial tracking and/or dead reckoning may be used to determine the position of device 200.

Similarly, speed information can be obtained from an accelerometer and direction information can be obtained from a gyroscope. In some such embodiments, microelectromechanical accelerometers and/or gyroscopes can be integrated into discrete components or on-board with processor 202. In other embodiments, historical position information can be used to estimate present speed and direction information. In some embodiments, this is done by dividing the change in position between the most recent position reading and the immediately prior one by the elapsed time between the readings. In other embodiments, more elaborate extrapolations based on a greater number of historical data points can also be used. It is an advantage of embodiments that estimate speed and direction from historical information and use wireless radio 210 to obtain position information by triangulation that no additional physical sensors are required, allowing lower-cost devices to be used with the system. In some embodiments, speed and direction information (and/or position information) can be obtained from sensors outside of device 200 via an appropriate interface. For example, if device 200 is installed in a vehicle, it may connect to the vehicle telemetry bus to obtain speed and direction information from the wheel-click sensors and/or compass. Any combination of integrated and external sensors may be used.

Wireless radio 210 may be a dedicated wireless networking interface, a general-purpose software-defined radio, or a more limited radio dedicated solely to the purposes of the embodiments of the invention as described elsewhere. In some embodiments, wireless radio 210 operates as a wireless network interface according to the IEEE 802.11 family of standards (i.e., a WiFi radio). In other embodiments, wireless radio 210 is a cellular voice and/or data radio according or the GSM, CMDA, 3GPP, IEEE 802.16 or other standards. In still other embodiments, wireless radio is a Bluetooth or other Personal-Area Network radio. In still other embodiments, wireless radio 210 is not a wireless networking interface, but a simplified radio that transmits beacon packets compatible with one or more wireless networking standards. In general, radio 210 may comprise a transmitter and a receiver, or may function only as a transmitter or only as a receiver.

In certain embodiments, device 200 may additionally include a display 212 and/or speaker 214 for responding to a detected impending collision, as discussed in greater detail below. These may be integrated into device 200 (as is the case when device 200 takes the form of a smartphone or tablet), or external (as when device 200 is installed in a vehicle). External displays and speakers may be connected via Bluetooth, a vehicle electronics bus, or other suitable interface. In some embodiments, both internal displays and speakers and external displays and speakers are present, and alerts can be presented to the user via either or both. In some embodiments, device may contain or connect to additional methods of responding to a detected impending collision. For example, if a vehicle includes a collision avoidance system, device 200 may integrate with it to automatically actuate brakes, steering inputs and/or the vehicle horn to avoid the collision.

Figure 3:
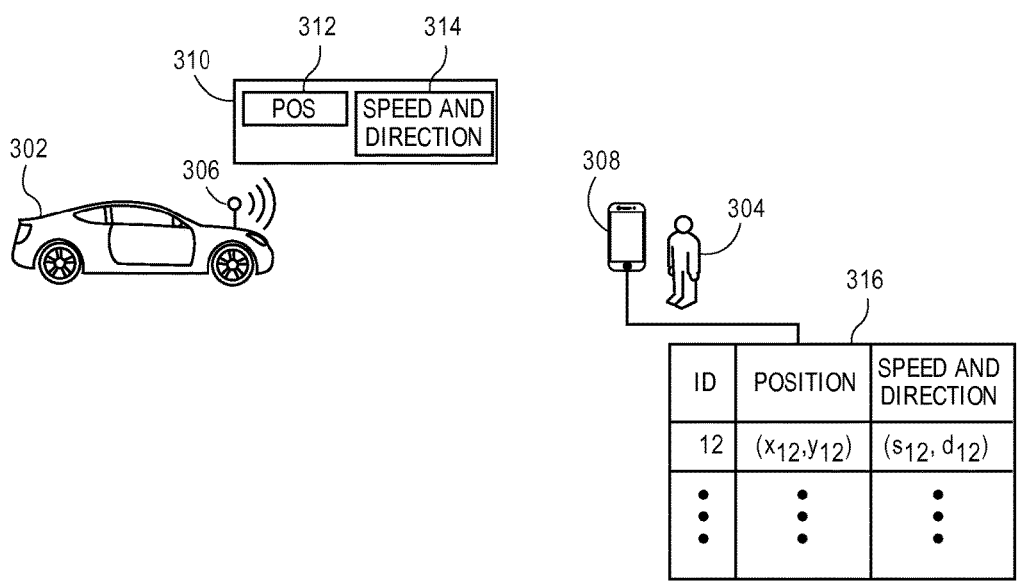
FIG. 3 depicts an exemplary operational environment for embodiments of the invention.

Turning now to FIG. 3, an exemplary operational environment suitable for embodiments of the invention is depicted. As depicted, vehicle 302 (which may be a motor vehicle, a bicycle, or any other type of vehicle) and pedestrian 304 each have a device suitable for use with embodiments of the invention. Specifically, vehicle 302 is associated with the first computing device, which also may be referred to as the "vehicle computing device" or the "beaconing device," and pedestrian 304 is associated with the second computing device, which also may be referred to as the "pedestrian computing device" or the "alerting device." In the depicted environment, the vehicle computing device 306 installed in vehicle 302 need only function in a send-only capacity. Accordingly, the wireless radio may not be a true wireless network interface, but only a simplified radio that transmits beacon packets advertising the position, speed, and direction of vehicle 302 to be received by the pedestrian computing device 308 for the benefit of user 304. Alternatively, the vehicle computing device 306 may function in a full send-receive mode, such that it can also receive beacons from other devices and generate collision alerts for the benefit of the driver. In various embodiment, vehicle computing device 306 may be a discrete, dedicated device which contains its own sensors and wireless radio for broadcasting the position, speed, and direction of the car, it may be a smartphone carried by the driver of vehicle 302, or it may be an integrated part of the telematics system of vehicle 302 which uses the sensors, displays and/or network interface of vehicle 302 for its function. In a more realistic scenario with multiple vehicles such as vehicle 302, such varied embodiments may coexist in different vehicles.

Functionally, vehicle computing device 306 gathers the position, speed, and direction of vehicle 302 and broadcasts it in a beacon, as described in greater detail below. In some embodiments, this broadcast is done periodically (for example, every 100 ms). In other embodiments, the broadcast is done whenever the position of the vehicle changes by more than a predetermined threshold (for example, whenever the vehicle is more than 50 m from wherever it broadcast the last beacon). In still other embodiments, the broadcast is done whenever the speed or direction changes by more than a predetermined threshold (for example, when the direction changes by more than five degrees or the speed by more than five miles per hour). In yet other embodiments, more than one of the previous techniques is used: for example, a broadcast is made periodically and also whenever the speed or direction changes.

Pedestrian computing device 308 of user 304 may be a smartphone, tablet or body-mounted computer with heads-up display. In a typical scenario, user 304 is using pedestrian computing device 308 for another purpose (such as navigating using a maps application, sending email or SMS messages, browsing the web or talking on the phone), and thus distracted from their immediate environment and unaware of the presence of vehicle 302. As a consequence, user 304 may unintentionally place themselves in danger by entering the path of vehicle 302 or be unaware that vehicle 302 has altered course towards them. As discussed above, a conventional warning system such as a horn may be ineffective even if the driver of vehicle 302 is aware of user 304 and uses it, due to user 304 wearing headphones or simply tuning out the horn in favor of pedestrian computing device 308. Accordingly, a warning delivered via pedestrian computing device 308 may be more effective in alerting user 304 and avoiding a collision. However, conventional wireless networking techniques take several seconds for devices to associate and may be unable to deliver a timely warning. Nor is it feasible to utilize a special purpose device or network protocol, as pedestrian computing device 308 is constrained by what user 304 already has. Accordingly, a technique called "beacon stuffing" has been developed, whereby the association process itself is used to convey time-critical information.

In conventional wireless networks, connection points periodically broadcast advertisements of their presence so that user devices can join the network. For example, in the IEEE 802.11 family of protocols, also known as "WiFi," access points regularly send out beacon packets with the name of the network and the address of the access point. Similarly, cellular phone networks typically have a dedicated "paging" channel monitored by handsets for announcing incoming calls, and Bluetooth devices generate and transmit inquiry messages as a part of the pairing process. Beacon stuffing encodes this time-critical information into such beacons so that it can be received and used to generate an alert by the mobile device without the time needed to associate with the network. In the scenario of FIG. 3, beacon 310 includes the position 312 and the speed and direction 314 of vehicle 302. In embodiments where the wireless network is WiFi network, for example, the SSID field of the beacon packet can be replaced by a special tag recognized by receiving devices, followed by position, speed, and direction information for the vehicle.

Beacon packet 310 will then be received by pedestrian computing device 308 as it monitors for available networks, and recognized as encoding the information based on the special tag. The position 312 and speed and direction 314 of vehicle 302 can then be extracted. In some embodiments, this information is used immediately to determine if a collision is imminent. One way of making this determination is to first check the position, speed, and direction of device pedestrian computing 308 (and therefore of user 304). User position, speed, and direction information can then be used to estimate the future position of user 304. For example, the position of the user can be calculated every tenth of a second for the next thirty seconds. In other embodiments, this information is precalculated and automatically updated whenever the sensors in device pedestrian computing 308 indicate a changed position, speed or direction. In a similar way, the future position of vehicle 302 is calculated based on the information received in beacon 310. Once the future positions are known, the distance between user 304 and vehicle 302 at each point in time can be calculated. If this distance falls below a predetermined threshold, pedestrian computing device 308 can immediately alert user 304 of the imminent collision. In one embodiment this threshold distance is five feet. In other embodiments, the threshold distance can be smaller (to reduce false alarms) or larger (to provide a greater margin of safety).

In some embodiments, an alert is generated and presented to the user whenever the point of closest approach is below the threshold. In other embodiments, the alert is only generated and presented to the user if this occurs and the time of that approach is below another threshold. For example, collisions predicted to occur more than more than ten seconds in the future may not generate an alert unless the estimated time to collision drops below ten seconds and a collision is still predicted.

If the distance at each point in time is sufficiently large, no collision is likely if user 304 and vehicle 302 maintain their current respective speeds and directions. However, should the user abruptly change speed or direction (for example, stopping in the middle of the street), the new speed and direction could result in a collision. In some embodiments, in order to minimize the delay in such a scenario, the most recently received position, speed, and direction for each vehicle is stored in collision table 316. When a change in user speed and direction is detected by the sensors in pedestrian computing device 308, an updated set of future positions for the user can be calculated and quickly compared against those of each known vehicle (and an alert generated if needed) without waiting for each vehicle to transmit another beacon.

Also stored in collision table 316 is an identifier for each vehicle, extracted from the beacon packet. In the WiFi embodiment described above, this identifier could simply be the Medium Access Control (MAC) address of the wireless interface in vehicle 302, as extracted from beacon 310. The vehicle identifier allows old data from a given vehicle to be removed when updated data is received. In some embodiments, the time of closest approach with each vehicle, as calculated when the beacon for that vehicle was received, is additionally stored in this table, and entries are sorted based on this field. It is an advantage of such embodiments that, when processing this list in the event user speed or direction changes, the closest vehicles are processed first, allowing the maximum amount of time for the user to react to an alert. In some embodiments, the estimated future positions for each vehicle are stored instead of (or in addition to) position, speed, and direction information for the vehicle in collision table 316 to avoid the need to recalculate them during such an update.

Figure 4:
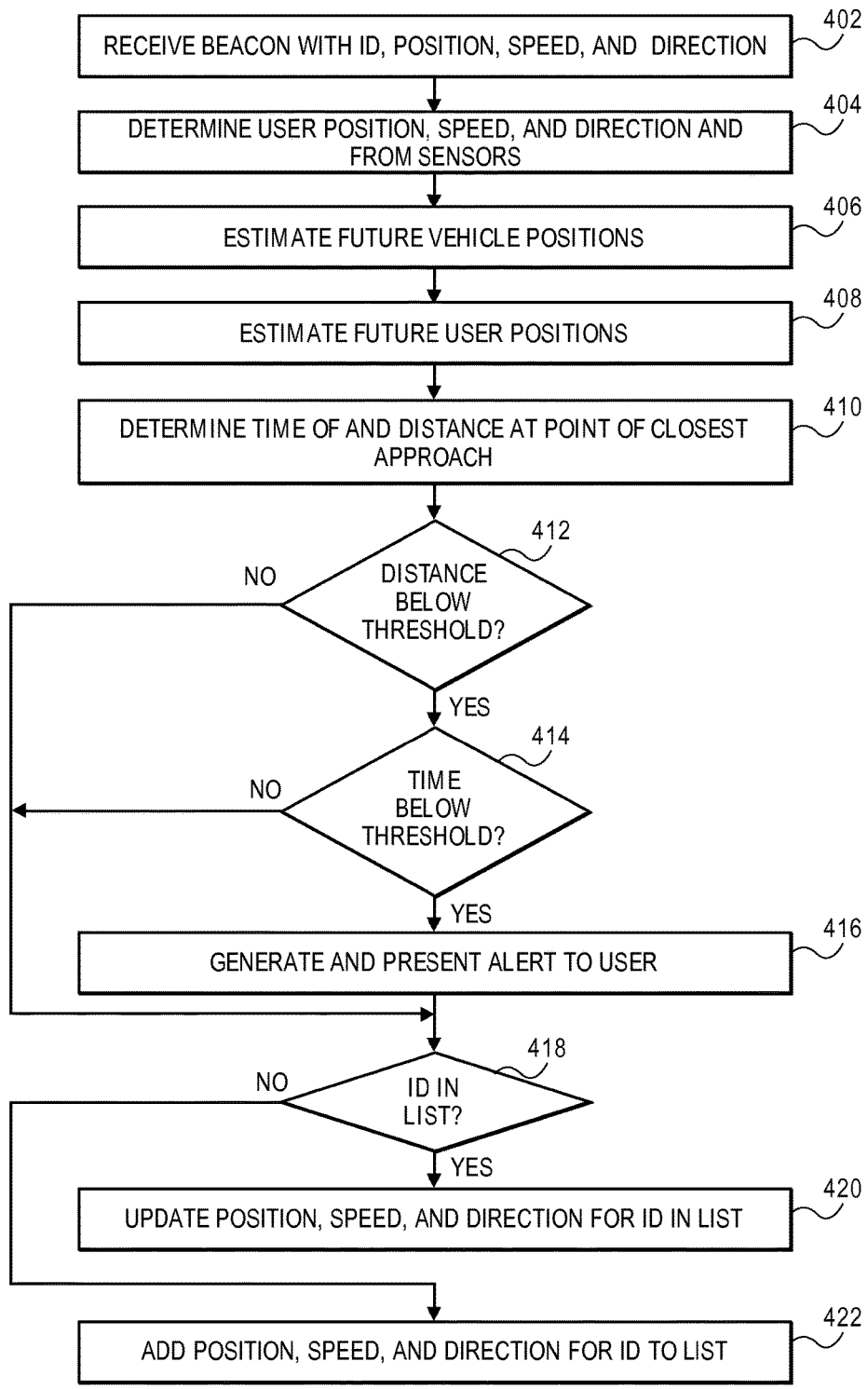
FIG. 4 depicts a flowchart detailing the operation of a first aspect of certain embodiments of the invention.

Turning now to FIG. 4, a flowchart detailing the operation of one aspect of certain embodiments of the present invention is disclosed. Operation begins at a step 402 when a wireless network association beacon, i.e., a beacon message, is received. In embodiments, the beacon message includes position, speed, and direction information associated with a vehicle. In some embodiments, this beacon is first identified as containing position, speed, and direction information by the presence of a distinguishing tag. In some embodiments, the beacon message further contains an identifier associated with the sender of the beacon. In some such embodiments, this identifier is a MAC address included in the beacon, while in other embodiments a dedicated field in the beacon message can be used. During this step the position, speed, and direction (and the identifier, if present) are extracted from the beacon message. Processing continues to a step 404 where the position, speed, and direction of the user's computing device, i.e., the pedestrian computing device, is determined. In some embodiments, the position, speed, and direction is determined by querying the sensors. In other embodiments, position, speed, and direction information for the user is continually updated by a separate processing thread and can be simply accessed form its storage location. For the sake of clarity, the two parties to the potential collision are referred to herein as the user and the vehicle, although operation is substantially identical whether the parties are pedestrians, bicyclists, vehicles, other road users, or a mix of both.

Next, at steps 406 and 408, similar processes are used to estimate future positions for the user and the vehicle as follows. For each time interval, an offset can be calculated based on the speed and direction of the user or vehicle and the length of the time interval. For example, a vehicle travelling at 30 m/s in a northerly direction will generate an offset of 3 m in the same northerly direction for a 0.1 s interval. This offset can be added to the estimated position at the beginning of the time interval to generate an estimated position at the end of the time interval. Other methods of generating estimated future positions are also contemplated. For example, a vehicle may be travelling along a road with a curve, and this may be known to an onboard GPS navigation system. Accordingly, the beacon may include additional information regarding anticipated changes in speed or direction to allow its future position to be estimated more accurately. If a navigation route including an upcoming turn has been entered, this information may also be included for the same purpose. Any time interval and time horizon may be used. One embodiment uses time intervals of 0.1 second and a time horizon of 30 s. Once user and vehicle positions have been calculated through the time horizon, the time of and distance at the point of closest approach can be calculated at step 410. In some embodiments this is done by iterating through the list of future times and calculating the distance between the user and the vehicle at each time while maintaining the minimum distance (and corresponding time) seen thus far. In some embodiments, steps 406, 408, and 410 are all performed simultaneously by calculating the estimated vehicle position, estimated user position and estimated distance between user and vehicle for each time interval before moving on to the next time interval.

Processing then proceeds to decision 412, where it is determined whether the minimum estimated distance between the user and the vehicle falls below a collision threshold. In some embodiments, this threshold is fixed. In other embodiments, the threshold depends on factors particular to the user and the vehicle; for example, a greater speed may indicate that a lower threshold should be used (as the vehicle will travel a greater distance during each time interval). Similarly, a decision involving two vehicles may employ a larger threshold than a decision involving two pedestrians, simply because the vehicles are larger. In some embodiments, the beacon includes information (such as type of road user or vehicle size) for use in determining or adjusting a threshold. If the distance is above the threshold, then processing skips to decision 418; otherwise, processing proceeds to decision 414.

At decision 414, the estimated time until the collision is compared to a threshold time (i.e., whether the collision is impending) to determine whether an alert should be generated for the user. For example, a collision estimated to occur in 30 s may not result in an alert, as the situation is likely to change in the intervening time. In some embodiments, this time threshold may also depend on factors particular to the vehicle as described above. In some embodiments, multiple thresholds are used to generate different urgencies of alerts. For example, a collision estimated to occur in 20 s could generate an ordinary notification, while a collision estimated to occur in 2 s could generate a full screen alert together with audible notification. If no alert needs to be generated, processing skips to decision 418. Otherwise, at step 416, the alert is generated and displayed to the user. As described above, a variety of types and urgencies of alerts can be presented to the user, and the appropriate type may vary depending on the identities of the parties, the time until the configuration and other factors. For example, a collision between two vehicles may generate one type of alert on a display screen or audio system in the vehicle, while a collision between two pedestrians may generate another, less urgent type of alert.

Once an alert has been generated if necessary, the position, speed, and direction of the vehicle can be cached in some embodiments. This process begins at decision 418, which examines a collision table for the presence of the identifier received at step 402. If the identifier is found, then prior beacons have been received from this vehicle and processing continues at step 420. Otherwise, this is the first beacon received for the vehicle and processing skips to step 422. At step 420, position, speed, and direction information for the vehicle is updated in the collision list. As discussed above, the collision list may include only position, speed, and direction information, or it may include information such as estimated future positions, supplementary information included in the beacon, or other information related to the vehicle. In some embodiments, prior estimates of the position, speed, and direction of the vehicle may be used in combination with the received position, speed, and direction information to more accurately estimate future positions. Alternatively, if the identifier is not already in the collision list, at step 422, the identifier, together with the associated position, speed, and direction information, can be added into the list of vehicles in the collision list. As discussed above, in some embodiments the collision list is sorted by the time of closest approach so that nearer vehicles are processed first when iterating the list. At this point, the method terminates.

Figures 5, 6:
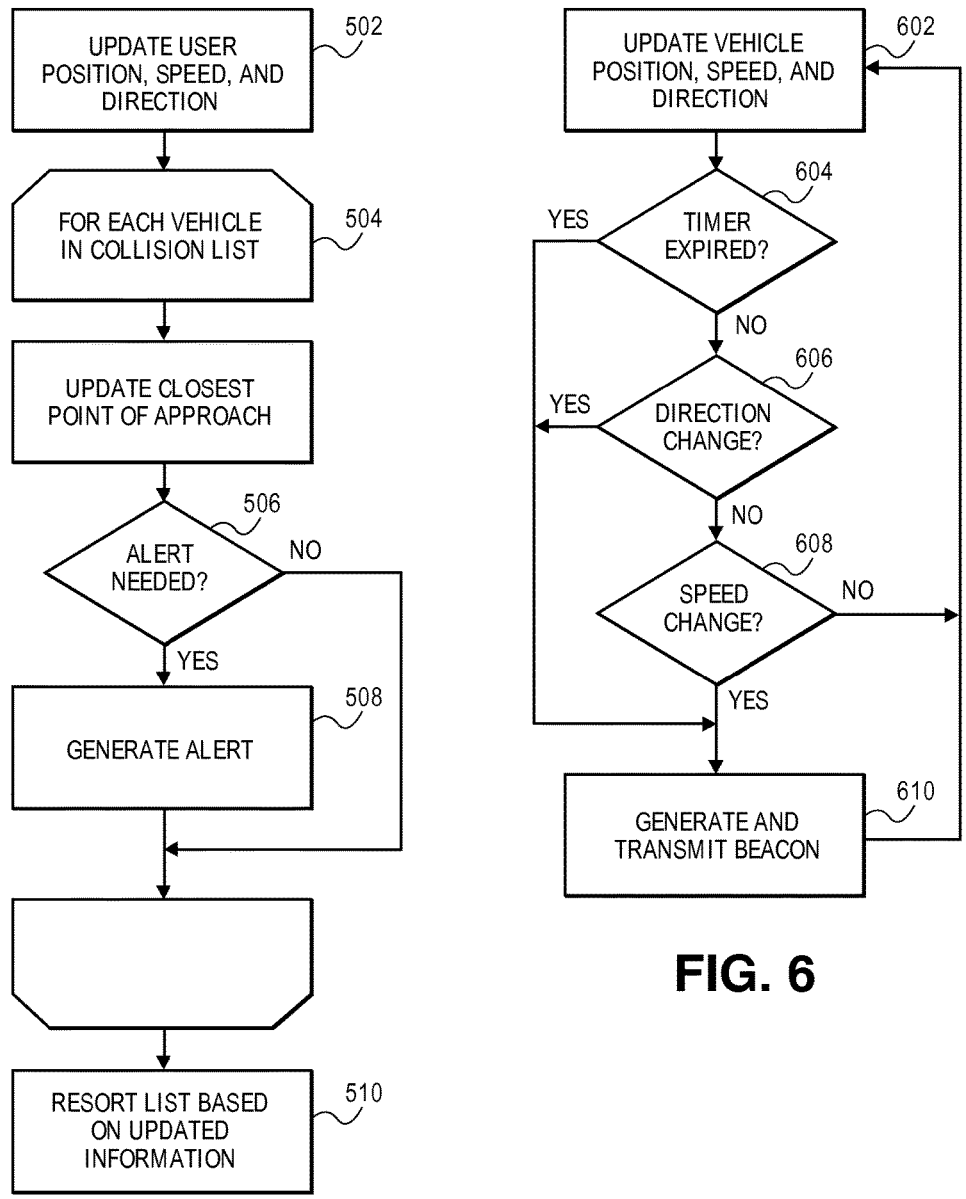
FIG. 5 depicts a flowchart detailing the operation of a second aspect of certain embodiments of the invention.
FIG. 6 depicts a flowchart detailing the operation of a third aspect of certain embodiments of the invention.

Turning now to FIG. 5, a flowchart detailing the operation of a second aspect of certain embodiments of the invention is depicted. At a high level, this operation updates the collision expectations for vehicles stored in the collision list. In some embodiments, this operation is performed periodically (for example, every 100 ms). In other embodiments, this operation is performed whenever the user's position, speed, or direction has changed by more than a threshold amount. In still other embodiment, the operation is performed periodically as well as whenever triggered by a change in the user's position, speed or direction. The operation begins at step 502 by updating the user's position, speed, and direction. As discussed above, this may be done by querying the sensors or by retrieving the most current values from where they have been stored. The operation continues at loop 504 by iterating through each vehicle stored in the collision list.

Once a vehicle has been selected for the current iteration of loop 504, the closest point of approach of the selected vehicle with the user is calculated at step 506. In some embodiments, this is done by repeating the process of steps 406-410; in others, historical information about the position, speed, and direction of the vehicle can be used to improve the estimate (for example, to determine if the vehicle is currently accelerating, turning, or braking). Processing them continues at decision 506, where it is determined whether to an alert is necessary. In some embodiments, this process is similar to the process of steps 412 and 414, in that both the distance at the closest point of approach and the estimated time until that point must be below appropriate thresholds. In other embodiments, different thresholds are used for this determination. In still other embodiments, the thresholds used depend on whether the update was periodic or triggered by a change in the user's speed or direction. If no alert is needed, loop 504 finishes its current iteration. If an alert is needed, it can be generated at step 508 as described above, and then loop 504 finishes its current iteration. Finally, at step 510, the collision list is resorted in order of the newly updated times of closest approach.

Turning now to FIG. 6, a flowchart detailing the operation of a third aspect of certain embodiments of the invention is depicted. This operation is employed by those embodiments to control the transmission of beacons by vehicle and other users of the system. Though the transmitter of the beacon in the following discussion is referred to as the vehicle, the discussion is equally applicable to beacons transmitted by all road users. The operation begins at step 602, when the position, speed, and direction of the vehicle is updated. This update can be generated from whatever internal or vehicle sensors are available, as discussed elsewhere. Additional information for inclusion in the beacon message may also be gathered at this point as well. Processing then proceeds to decision 604, where it is determined whether the beacon timer has expired. IN some embodiments, this beacon timer may be 100 ms. If the beacon timer has expired, processing skips to step 610; otherwise it proceeds to decision 606. At decision 606, it is determined whether the direction of travel has changed by more than a particular threshold. In some embodiments, this threshold may be 10°. If the change in direction exceeds this threshold, processing again skips to step 610. Otherwise processing proceeds to decision 608. There is it determined whether the speed has changed by more than a predetermined threshold. In some embodiments, this threshold is 5 mph. If so processing continues to step 610; otherwise it returns (perhaps after an appropriate delay) to step 602. Finally, at step 610, a beacon containing the updated position, speed, and direction is generated and transmitted. As discussed above, this beacon generally takes the form of a standard wireless networking beacon with information encoded in the network name or other parameters. In some embodiments, this beacon may additionally contain other information such as anticipated route of travel, anticipated turns, acceleration, braking, or turning rates to allow a receiver to more accurately estimate the future position of the vehicle.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for alerting a user of an impending collision, comprising:
   a first device comprising:
      a first transmitter periodically transmitting a first 802.11 wireless network association beacon including position, speed, and direction information associated with the first device;
   a second device comprising:
      a first receiver operable to receive the first 802.11 wireless network association beacon;
      one or more sensors operable to determine position, speed, and direction information associated with the second device;
      a first processor;
      one or more computer-readable media storing non-transitory computer-executable instructions that, when executed by the first processor, perform a method of alerting the user of the impending collision comprising the steps of:
         determining that the second device has a lower time of closest approach to the first device than at least one other device;
         processing, based on the time of closest approach, the position, speed, and direction information associated with the second device before information associated with the at least one other device;
         determining, based on the position, speed, and direction information associated with the first device and the position, speed, and direction information associated with the second device, that a distance between the first device and the second device will be less than a predetermined threshold at a future time;
         generating a first alert of the impending collision; and
         presenting the first alert to the user.

2. The system of claim 1, wherein the second device further comprises a display, and wherein the alert is presented to the user on the display.

3. The system of claim 1, wherein the second device further comprises a speaker, and wherein the alert is presented to the user via the speaker.

4. The system of claim 1, wherein the second device is a smartphone and the first device is located in a motor vehicle.

5. The system of claim 1, wherein the step of determining comprises the substeps of:
   determining, based on the position, speed, and direction of the first device, an estimated future position of the first device for each time of a plurality of future times;
   determining, based on the position, speed, and direction of the second device, an estimated future position of the second device for each time of the plurality of future times;
   determining a distance between the first device and the second device at each time of the plurality of future times; and
   comparing each distance so determined to the predetermined threshold.

6. The system of claim 1, wherein the position, speed, and direction information associated with the first device is encoded in the service set identifier (SSID) of the 802.11 beacon.

7. The system of claim 1, wherein the second device further comprises:
   a second transmitter periodically transmitting a second 802.11 wireless network association beacon including the position, speed, and direction information associated with the second device; and
   wherein the first device further comprises:
      a receiver operable to receive the second wireless network 802.11 association beacon;
      a second processor;
      one or more computer-readable media storing computer-executable instructions that, when executed by the first processor, perform a method of alerting a user of the first device of the impending collision comprising the steps of:
         determining, based on the position, speed, and direction information associated with the first device and the position, speed, and direction information associated with the second device, that the distance between the first device and the second device will be less than a predetermined threshold at the future time;

generating a second alert of the impending collision; and presenting the second alert to a user of the first device.

8. One or more computer-readable media storing non-transitory computer-executable instructions which, when executed by a processor, perform a method of alerting a user to an impending collision, comprising the steps of:

receiving an 802.11 wireless network association beacon including position, speed, and direction information associated with a vehicle;

determining position, speed, and direction information associated with a user device;

generating an estimated position of the user device at a future time and an estimated position of the vehicle at the future time;

wherein the vehicle is determined to have a lower time of closest approach to the user device than at least one other vehicle;

making a determination that a distance between the estimated position of the user device and the estimated position of the vehicle at the future time is below a predetermined threshold before a future position of the at least one other vehicle is determined;

in response to the determination, presenting an alert of the impending collision on the user device.

9. The media of claim 8, wherein the user device is a smartphone.

10. The media of claim 8, wherein the position, speed, and direction information associated with the vehicle is encoded in a service set identifier (SSID) of the beacon.

11. The media of claim 8, wherein the method further comprises the step of maintaining a list of vehicles from which position, speed, and direction information has been received together with position, speed, and direction information associated with each vehicle.

12. The media of claim 11, wherein the method further comprises the steps of:

obtaining updated position, speed, and direction information for the user device;

calculating an updated estimated position of the user device at the future time;

determining, based on the updated estimated position of the user device at the future time and the estimated position of a vehicle on the list of vehicles at the future time, that the distance between the user device and the vehicle is below the predetermined threshold; and presenting a further alert of a further imminent collision on the user device.

13. The media of claim 8, wherein the alert is presented via a display of the user device.

14. The media of claim 8, wherein the position of the user device is determined from a global positioning system sensor and the speed of the device is obtained at least in part from an accelerometer.

15. A mobile computing device, comprising:

a processor;

one or more sensors operable to determine position, speed, and direction information associated with the mobile computing device;

a display;

a speaker;

a wireless network interface operable to receive an 802.11 wireless network association beacon;

one or more computer-readable media storing non-transitory computer-executable instructions which, when executed by a processor, perform a method of alerting a user of the mobile computing device to an impending collision, comprising the steps of:

receiving an 802.11 wireless network association beacon associated with a first vehicle and including position, speed, and direction information associated with the first vehicle, receiving an 802.11 wireless network associated beacon associated with a second vehicle, processing the information associated with the first vehicle before the information associated with the second vehicle based on a time of closest approach of the first vehicle relative to the user and a time of closest approach of the second vehicle relative to the user;

determining, based on the position, speed, and direction information associated with the mobile computing device and the position, speed, and direction information associated with the first vehicle, the existence of the impending collision between the first vehicle and the user of the mobile computing device;

presenting to the user via at least one of the display and the speaker an alert of the impending collision.

16. The mobile computing device of claim 15, wherein the position, speed, and direction information associated with the first vehicle is encoded in a service set identifier (SSID) of the beacon.

17. The mobile computing device of claim 15, wherein an urgency of the alert presented to the user depends on a time until the impending collision.

18. The mobile computing device of claim 15, wherein the first vehicle includes a device operable to alert an operator of the first vehicle of the impending collision.

19. The mobile computing device of claim 15, wherein the method further comprises the step of maintaining a list of vehicles from which position, speed, and direction information has been received together with position, speed, and direction information most recently received from each vehicle.

* * * * *